US009076406B2

United States Patent
Seo et al.

(10) Patent No.: US 9,076,406 B2
(45) Date of Patent: Jul. 7, 2015

(54) POWER SUPPLYING UNIT WITH LINEARLY VARYING GATE HIGH VOLTAGE AND LIQUID CRYSTAL DISPLAY DEVICE INCLUDING THE SAME

(75) Inventors: Seung-Pyo Seo, Daegu (KR); Hyoun-Woo Kim, Gyeonggi-do (KR); Sung-Chul Ha, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 598 days.

(21) Appl. No.: 13/339,555

(22) Filed: Dec. 29, 2011

(65) Prior Publication Data

US 2012/0169744 A1   Jul. 5, 2012

(30) Foreign Application Priority Data

Dec. 30, 2010 (KR) .................. 10-2010-0138385

(51) Int. Cl.
*G06F 3/038* (2013.01)
*G09G 3/36* (2006.01)
*H02M 3/07* (2006.01)

(52) U.S. Cl.
CPC .............. *G09G 3/3696* (2013.01); *H02M 3/07* (2013.01); *G09G 2310/0289* (2013.01); *G09G 2320/041* (2013.01); *G09G 2330/02* (2013.01)

(58) Field of Classification Search
CPC .................................................. G09G 3/3674
USPC ...................................................... 345/100
See application file for complete search history.

(56) References Cited

U.S. PATENT DOCUMENTS

| | | | |
|---|---|---|---|
| 5,088,806 A | | 2/1992 | McCartney et al. |
| 8,730,146 B2* | | 5/2014 | Lee ............................... 345/101 |
| 2004/0041762 A1* | | 3/2004 | Naiki et al. ...................... 345/87 |
| 2005/0190171 A1* | | 9/2005 | Jang et al. ...................... 345/204 |
| 2006/0071926 A1* | | 4/2006 | Lee et al. ....................... 345/211 |
| 2007/0164969 A1 | | 7/2007 | Kim |
| 2007/0216671 A1 | | 9/2007 | Oku et al. |
| 2008/0054987 A1* | | 3/2008 | Choi et al. ..................... 327/512 |
| 2008/0062100 A1* | | 3/2008 | Hong et al. ....................... 345/87 |

(Continued)

FOREIGN PATENT DOCUMENTS

| | | |
|---|---|---|
| CN | 101042508 A | 9/2007 |
| CN | 101278225 A | 10/2008 |
| KR | 10-2009-0082709 | *  7/2009 |
| WO | 2008/102826 A1 | 8/2008 |

OTHER PUBLICATIONS

Ming et al., "CMOS compatible thermal anemometer based on laterally polysilicon diodes", Journal of Southeast University (Natural Science Edition), vol. 32, No. 4, pp. 569-571, Jul. 2002 Please see the English Abstract, figures therein and CN Office Action.

(Continued)

*Primary Examiner* — Roy Rabindranath
(74) *Attorney, Agent, or Firm* — Morgan, Lewis & Bockius LLP

(57) ABSTRACT

A power supplying unit for a liquid crystal display device includes: a power integrated circuit for generating a source voltage and a compensation voltage, the compensation voltage linearly varying according to an ambient temperature; and a charge pumping part for generating a gate high voltage using the source voltage and the compensation voltage, the gate high voltage linearly varying when the ambient temperature is lower than a reference temperature.

13 Claims, 6 Drawing Sheets

(56) References Cited

U.S. PATENT DOCUMENTS

| | | |
|---|---|---|
| 2009/0021669 A1* | 1/2009 | Lee et al. ............... 349/72 |
| 2009/0040163 A1* | 2/2009 | Sun ........................ 345/98 |
| 2009/0184916 A1 | 7/2009 | Miyazaki et al. |
| 2010/0176872 A1 | 7/2010 | Saikusa et al. |

OTHER PUBLICATIONS

Chinese Office Action dated Dec. 20, 2013 for Patent Application No. 201110461256.9.

* cited by examiner

US 9,076,406 B2

POWER SUPPLYING UNIT WITH LINEARLY VARYING GATE HIGH VOLTAGE AND LIQUID CRYSTAL DISPLAY DEVICE INCLUDING THE SAME

The present application claims the benefit of Korean Patent Application No. 10-2010-0138385 filed in Korea on Dec. 30, 2010, which is hereby incorporated by reference in its entirety.

BACKGROUND

1. Field of the Disclosure

The present disclosure relates to a liquid crystal display device, and more particularly, to a power supplying unit having a linear low temperature compensating circuit that linearly compensates a gate high voltage according to a temperature and a liquid crystal display device including the power supplying unit.

2. Discussion of the Related Art

Recently, as information age progresses, demand for display device has increased in various forms. In addition, various flat panel displays (FPDs) having a thin profile, a light weight and a low power consumption such as a liquid crystal display (LCD), a plasma display panel (PDP) and an organic light emitting diode (OLED) have been researched.

Among various FPDs, a liquid crystal display (LCD) device is one of the most widely utilized FPDs. The LCD device includes two substrates having a pixel electrode and a common electrode, respectively, and a liquid crystal layer between the two substrates. In the LCD device, an alignment direction of liquid crystal molecules of the liquid crystal layer is determined according to an electric field generated by voltages applied to the pixel electrode and the common electrode and an image is displayed by controlling polarization of incident light according to the alignment direction.

In addition, since the LCD device has advantages such as high contrast ratio and superiority in displaying a moving image, the LCD device has been used for a monitor of a computer or a television as well as a display unit of a mobile terminal by substituting for a cathode ray tube (CRT).

The LCD device includes a gate driving unit supplying a gate signal to a display panel. Recently, a gate-in-panel (GIP) type LCD device where the gate driving unit is integrated in the display panel has been widely used. Since the gate driving unit of the GIP type LCD device includes an amorphous silicon thin film transistor (a-Si TFT), the GIP type LCD device is susceptible to a temperature as compared with a conventional LCD including a gate driving unit of a driving integrated circuit (D-IC) that includes a single crystalline silicon TFT. Specifically, as a temperature decreases, an ON-current of a pixel TFT decreases. Since a data signal is not sufficiently supplied to each pixel while the pixel TFT is turned on, display quality of the LCD device is deteriorated.

To prevent deterioration in display quality, an LCD device including a low temperature compensating circuit for supplying a boosted gate high voltage (VGH) that turns on the pixel TFT when an ambient temperature is lower than a reference temperature has been suggested.

FIG. 1 is a block diagram showing a power supplying unit for a liquid crystal display device according to the related art. In FIG. 1, a power supplying unit 10 includes a power integrated circuit (IC) 20, a charge pumping part 30 and a low temperature compensating part 40.

The power IC 20 generating a plurality of voltages for various units of a liquid crystal display (LCD) device includes a boosting part 22 generating a source voltage VDD and a level shifting part 24 sequentially supplying a gate high voltage VGH to a gate driving unit according to a control signal of a timing controlling unit (not shown).

The charge pumping part 30 boosts up the source voltage VDD and generates the gate high voltage VGH having different voltages according to a temperature.

The low temperature compensating part 40 controls the charge pumping part 30 so that the charge pumping part 30 can generate the gate high voltage VGH having different voltages according to an ambient temperature. For example, when the ambient temperature is equal to or higher than a reference temperature, the charge pumping part 30 may generate the gate high voltage VGH having a voltage twice as high as the source voltage VDD according to control of the low temperature compensating part 40. In addition, when the ambient temperature is lower than the reference temperature, the charge pumping part 30 may generate the gate high voltage VGH having a voltage three times as high as the source voltage VDD according to control of the low temperature compensating part 40.

Accordingly, the power IC 20 supplies a higher gate high voltage VGH in a lower ambient temperature so that deterioration in display quality can be prevented by compensating charge of each pixel by a data signal through a pixel TFT.

FIG. 2 is a view showing a gate high voltage outputted from a power supplying unit for a liquid crystal display device according to the related art. In FIG. 2, the power supplying unit 10 (of FIG. 1) outputs a gate high voltage VGH of a first voltage V1 when an ambient temperature is equal to or higher than a reference temperature Tref, and outputs the gate high voltage VGH of a second voltage V2 when the ambient temperature is lower than the reference temperature Tref. The first voltage V1 may be twice as high as a source voltage VDD (V1=2VDD) and the second voltage V2 may be three times as high as the source voltage VDD (V2=3VDD). As the gate high voltage VGH increases from the first voltage V1 to the second voltage V2, an ON-current of a pixel thin film transistor (TFT) increases. Since the ON-current of the pixel TFT in low temperature surroundings is compensated, each pixel is sufficiently charged by a data signal in a shorter time period and deterioration in display quality is prevented.

However, since the gate high voltage VGH generated by the related art power supplying unit 10 including the charge pumping part 30 (of FIG. 1) and the low temperature compensating part 40 (of FIG. 1) is restricted to one of the first and second voltages V1 and V2 that respectively are twice and three times as high as the source voltage VDD, there exists a problem such that an unnecessary voltage is supplied. The gate high voltage that is required for sufficiently charging each pixel with the data signal while the pixel TFT is turned on in low temperature surroundings increases according to decrease of the ambient temperature. However, since the gate high voltage VGH supplied from the power supplying unit 10 is restricted to one of the first and second voltages, the excessive gate high voltage is used in the LCD device and power consumption of the LCD device increases.

For example, in a linear section of FIG. 2 where the ambient temperature is lower than the reference temperature Tref, the required gate high voltage linearly increases under the second voltage V2 according to decrease of the ambient temperature and the power supplying unit 10 supplies the gate high voltage VGH of the second voltage V2. As a result, the power loss corresponding to difference between the supplied gate high voltage and the required gate high voltage is generated to cause increase in power consumption of the LCD device. In addition, since the low temperature compensating part 40 is separately formed outside the power IC 20, fabrication cost of the LCD device increases. Further, when the ambient temperature is steeply changed, the gate high voltage VGH cannot rapidly transition from the first voltage V1 to the second voltage V2. As a result, deterioration in display quality such as a block dim occurs.

SUMMARY OF THE DISCLOSURE

The present disclosure is directed to a power supplying unit where power consumption and fabrication cost are reduced and a liquid crystal display device including the power supplying unit.

Additional features and advantages of the invention are set forth in the following description, and in part are apparent from the description, or may be learned by practicing of the invention. The objectives and other advantages of the invention can be realized and attained by the structures particularly pointed out in the written description and claims hereof as well as the appended drawings.

To achieve these and other advantages and in accordance with the purpose according to one aspect of the present invention, as embodied and broadly described herein, a power supplying unit for a liquid crystal display device includes: a power integrated circuit for generating a source voltage and a compensation voltage, the compensation voltage linearly varying according to an ambient temperature; and a charge pumping part for generating a gate high voltage using the source voltage and the compensation voltage, the gate high voltage linearly varying when the ambient temperature is lower than a reference temperature.

In another aspect, a liquid crystal display device includes: a liquid crystal panel displaying an image; a data driving unit supplying a data signal to the liquid crystal panel; a timing controlling unit supplying an RGB data and a data control signal to the data driving unit; and a power supplying unit supplying a gate high voltage to the liquid crystal panel, wherein the power supplying unit includes: a power integrated circuit for generating a source voltage and a compensation voltage, the compensation voltage linearly varying according to an ambient temperature; and a charge pumping part for generating the gate high voltage using the source voltage and the compensation voltage, the gate high voltage linearly varying when the ambient temperature is lower than a reference temperature.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Reference will now be made in detail to the preferred embodiments, examples of which are illustrated in the accompanying drawings.

Figure 1:
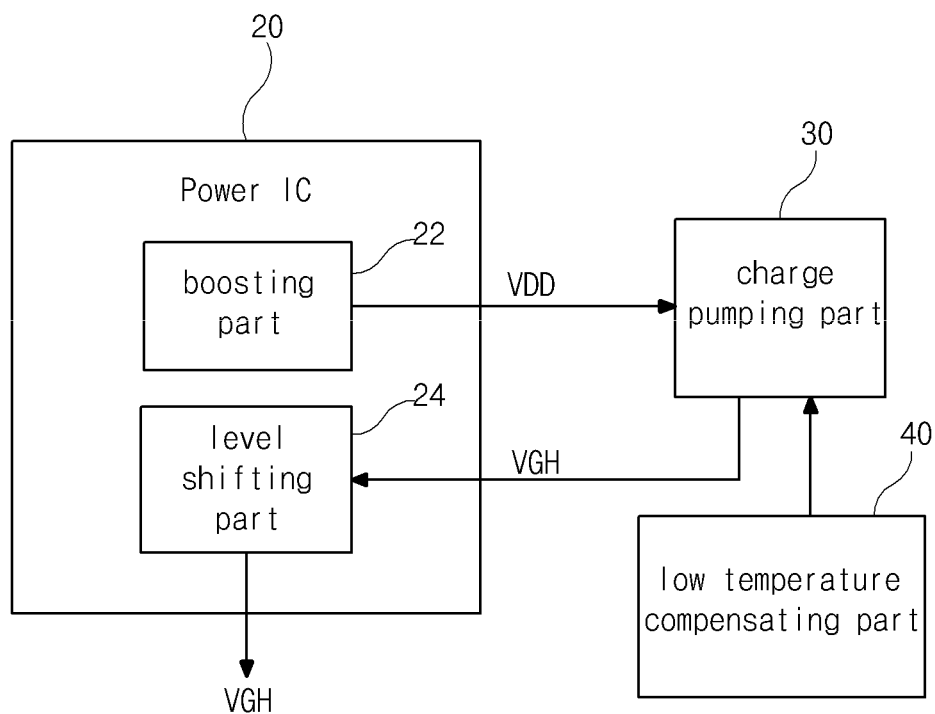
FIG. 1 is a block diagram showing a power supplying unit for a liquid crystal display device according to the related art.
Figure 2:
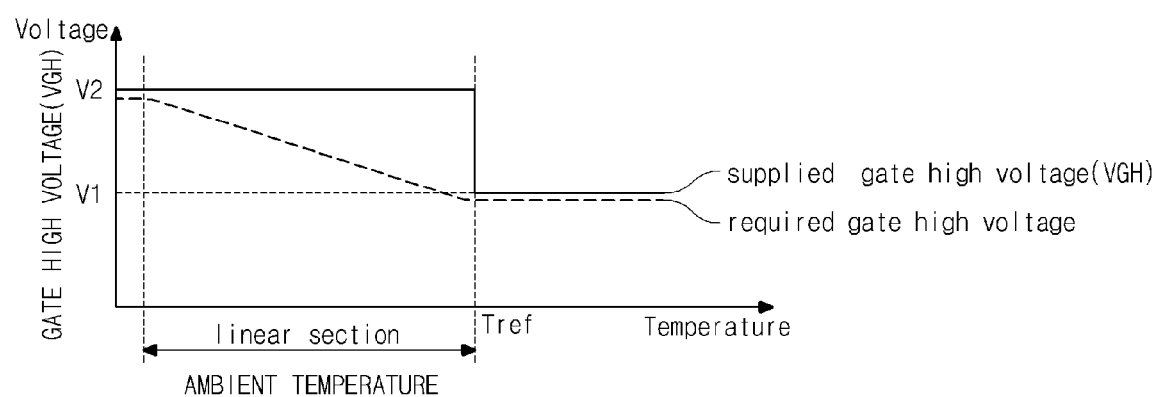
FIG. 2 is a view showing a gate high voltage outputted from a power supplying unit for a liquid crystal display device according to the related art.
Figure 3:
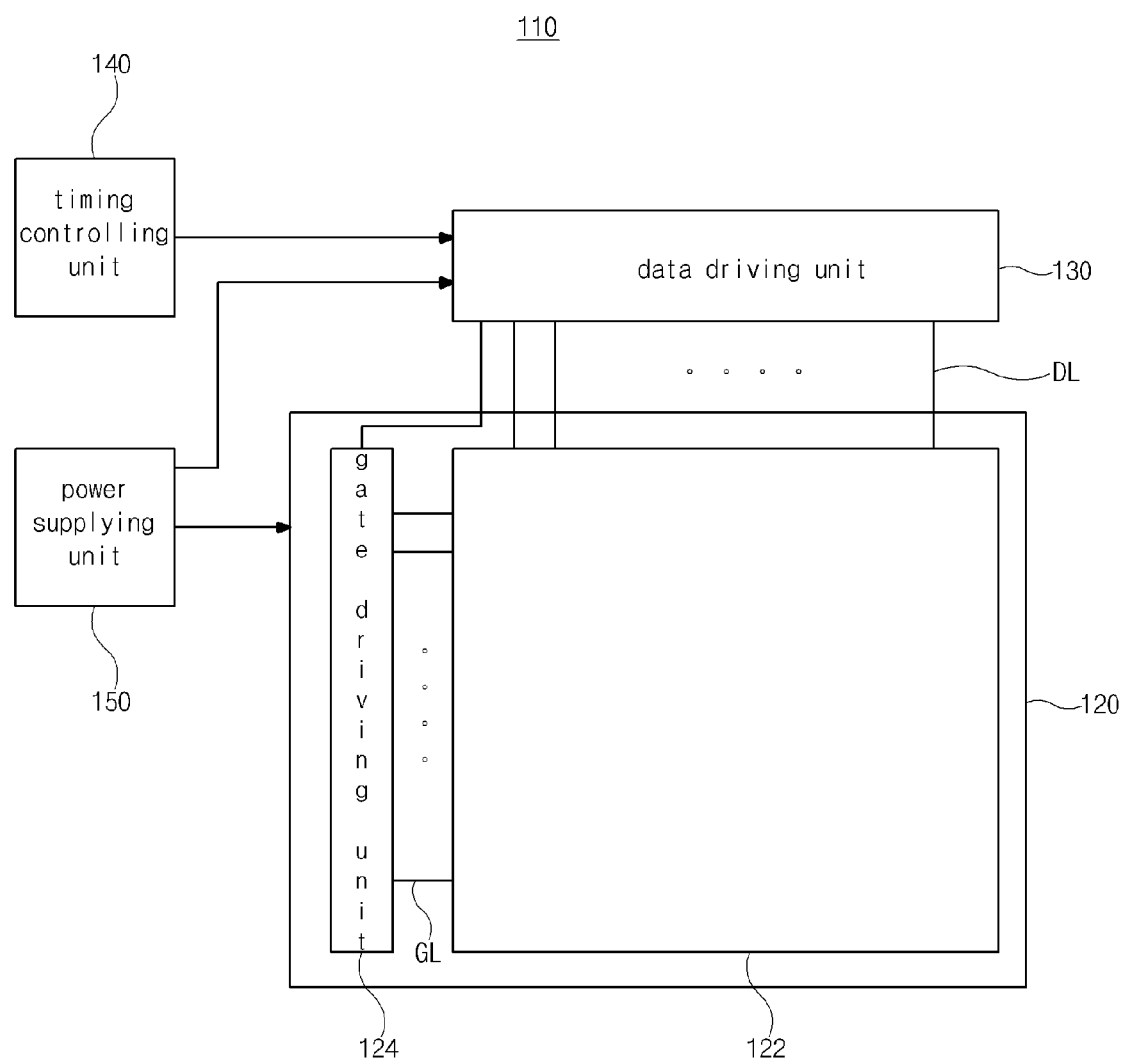
FIG. 3 is a view showing a liquid crystal display device according to an embodiment of the present invention.

FIG. 3 is a view showing a liquid crystal display device according to an embodiment of the present invention.

In FIG. 3, a liquid crystal display (LCD) device 110 includes a liquid crystal panel 120, a data driving unit 130, a timing controlling unit 140 and a power supplying unit 150. The liquid crystal panel 120 includes a displaying unit 122 that displays an image using a gate signal and a data signal and a gate driving unit 124 that generates the gate signal using a plurality of gate control signals. The displaying unit 122 includes a plurality of gate lines GL, a plurality of data lines DL, a pixel thin film transistor (TFT) (not shown), a liquid crystal capacitor (not shown) and a storage capacitor (not shown). The plurality of gate lines GL cross the plurality of data lines DL to define a plurality of pixel regions (not shown). In addition, the pixel TFT connected to the gate line GL and the data line DL, and the liquid crystal capacitor and the storage capacitor are connected to the pixel TFT.

Although not shown, the liquid crystal panel 120 may include first and second substrates facing and spaced apart from each other and a liquid crystal layer between the first and second substrates. For example, the plurality of gate lines GL, the plurality of data lines DL, the pixel TFT may be formed on the first substrate. In addition, the gate driving unit 124 may be formed on the first substrate together with the plurality of gate lines GL and the plurality of data lines DL. For example, the gate driving unit 124 may include a shift register. The LCD device 110 where the gate driving unit 124 is integrated in the liquid crystal panel 120 may be referred to as a gate-in-panel (GIP) type LCD device.

The data driving unit 130 generates the data signal using a plurality of data control signals and supplies the data signal to the liquid crystal panel 120. For example, the data driving unit 130 may include a plurality of driving integrated circuits (D-ICs) and the plurality of D-ICs may be attached onto the first substrate through a chip on glass (COG) method.

The timing controlling unit 140 receives an original image signal and a plurality of control signals such as a data enable signal, a vertical sync signal, a horizontal sync signal and a clock signal from an external system such as a graphic card and a television system and generates an RGB data, a plurality of gate control signals and a plurality of data control signals using the original image signal and the plurality of control signals. In addition, the timing controlling unit 140 supplies the RGB data and the plurality of data signals to the data driving unit 130 and supplies the plurality of gate control signals to the gate driving unit 124. Further, the timing controlling unit 150 may generate a power control signal and may supply the power control signal to the power supplying unit 150.

The power supplying unit 150 generates a plurality of driving voltages using the power control signal and supplies the plurality of driving voltages to the data driving unit 130 and the liquid crystal panel 120. Specifically, the power supplying unit 150 generates a gate high voltage VGH for turning on the pixel TFT of the liquid crystal panel 120 and supplies the gate high voltage VGH to the gate driving unit 124. For example, the power supplying unit 150 may compensate the gate high voltage VGH by linearly changing a magnitude of the gate high voltage VGH according to an ambient temperature and may supply the compensated gate high voltage VGH to the gate driving unit 124. Further, the gate driving unit 124 may generate the gate signal using the gate high voltage VGH.

Figure 4:
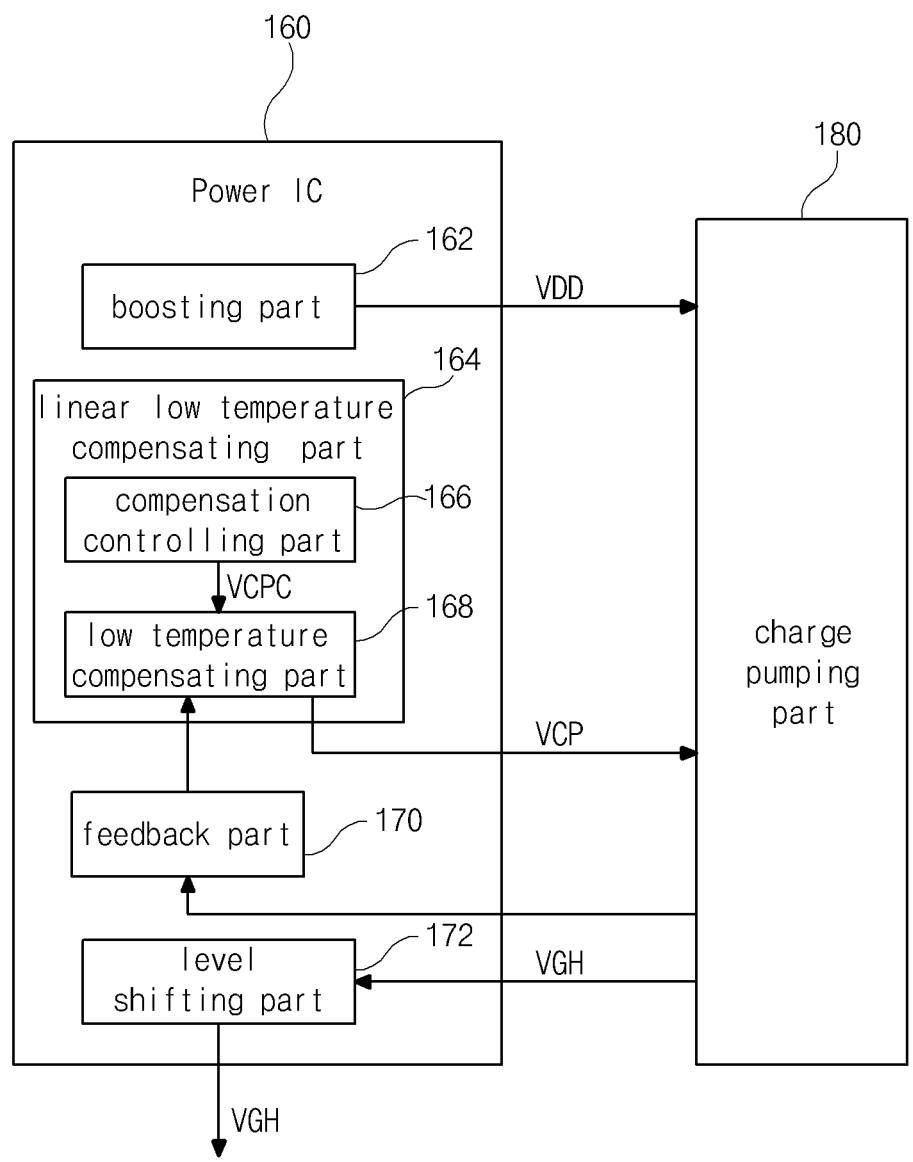
FIG. 4 is a block diagram showing a power supplying unit for a liquid crystal display device according to an embodiment of the present invention.

FIG. 4 is a block diagram showing a power supplying unit for a liquid crystal display device according to an embodiment of the present invention.

In FIG. 4, a power supplying unit 150 includes a power integrated circuit (IC) 160 and a charge pumping part 180. The power IC 160 generates the plurality of driving voltages. For example, the power IC 160 may generate a source voltage VDD and may supply the source voltage VDD to the charge pumping part 180. In addition, the power IC 160 may receive the gate high voltage VGH from the charge pumping part 180 and may supply the gate high voltage VGH to the gate driving part 124 (of FIG. 3) by switching.

The power IC 160 includes a boosting part 162 for generating the source voltage VDD, a linear low temperature compensating part 164 for linearly compensating the gate high voltage VGH according to the ambient temperature, a feedback part 170 for regulating the compensated gate high voltage VGH according to a feedback voltage VFB (of FIG. 5) and stabilizing the gate high voltage VGH in a relatively short time period and a level shifting part 172 for switching the gate high voltage VGH according to the power control signal of the timing controlling unit 140 and outputting the gate high voltage VGH to the gate driving unit 124.

In addition, the linear low temperature compensating part 164 includes a compensation controlling part 166 for generating a compensation control voltage VCPC corresponding to the ambient temperature and a low temperature compensating part 168 for generating a compensation voltage VCP corresponding to the ambient temperature according to the compensation control voltage VCPC.

The charge pumping part 180 boosts up the source voltage VDD of the power IC 160 and generates the gate high voltage VGH by adding the boosted source voltage VDD and the compensation voltage VCP. As a result, the charge pumping part 180 generates the compensated gate high voltage VGH that linearly varies according to the ambient temperature in a linear section.

For example, the charge pumping part 180 may generate the gate high voltage VGH of a first voltage V1 when the ambient temperature is equal to or higher than a reference temperature Tref. Further, the charge pumping part 180 may generate the gate high voltage VGH having a linearly varying voltage according to decrease of the ambient temperature when the ambient temperature is in the linear section lower than the reference temperature Tref, and the charge pumping part 180 may generate the gate high voltage VGH of a second voltage V2 greater than the first voltage V1 when the ambient temperature is beyond the linear section lower than the reference temperature Tref. The gate high voltage VGH may linearly vary between the first and second voltages V1 and V2 in the linear section. In addition, the first voltage V1 may be twice as high as the source voltage VDD (V1=2VDD) and the second voltage may be three times as high as the source voltage VDD (V2=3VDD).

Since the power supplying unit 150 supplies the gate high voltage VGH that has linearly increasing voltage within the second voltage V2 according to decrease of the ambient temperature in the linear section, deterioration in display quality due to decrease of the ambient temperature is prevented and fabrication cost of the LCD device 110 is reduced. In addition, the compensated gate high voltage VGH is rapidly stabilized by using the feedback voltage VFB, deterioration in display quality is prevented even when the ambient temperature is steeply changed or the load is steeply changed.

Figure 5:
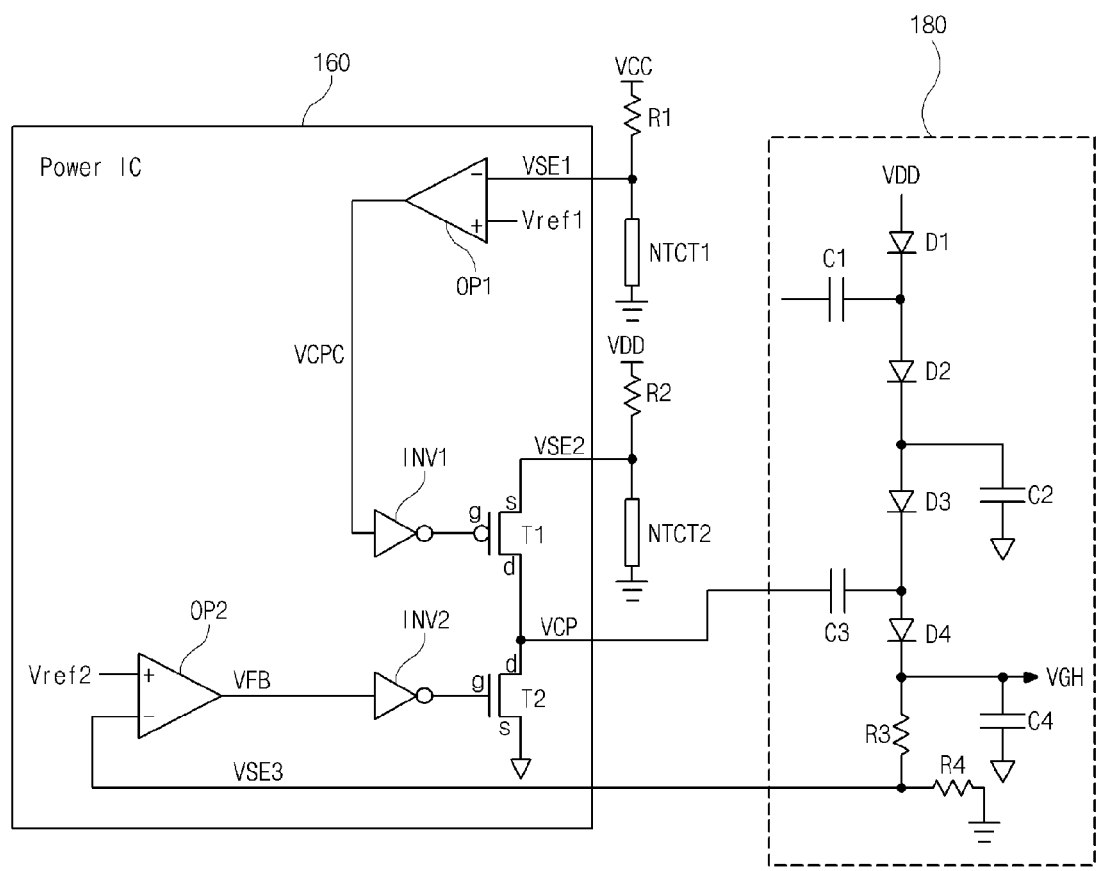
FIG. 5 is a circuit diagram showing a power supplying unit according to an exemplary embodiment of the present invention.

FIG. 5 is a circuit diagram showing a power supplying unit according to an exemplary embodiment of the present invention.

In FIG. 5, the power IC 160 of the power supplying unit 150 (of FIG. 4) includes a first comparator OP1, a second comparator OP2, a first inverter INV1, a second inverter INV2, a first transistor T1 and a second transistor T2. For example, the first comparator OP1 may correspond to the compensation controlling part 166 (of FIG. 4) and the first transistor T1 may correspond to the low temperature compensating part 168. Further, the second comparator OP2 and the second transistor T2 may correspond to the feedback part 170.

The first comparator OP1 compares a first sense voltage VSE1 corresponding to the ambient temperature with a first reference voltage Vref1 to output the compensation control voltage VCPC.

The first comparator OP1 is connected to a first temperature sensing part for generating the first sense voltage VSE1 and the first transistor T1. For example, the first temperature sensing part may include a first resistor R1 and a first temperature sensor NTCT1 connected in series between a digital source voltage VCC and a ground voltage. In addition, the first comparator OP1 may include an operational amplifier (OP AMP) and the first temperature sensor NTCT1 may include a thermally sensitive resistor (thermistor) having a negative temperature coefficient (NTC) such that a resistance increases according to decrease of an ambient temperature.

The first sense voltage VSE1 of a connection node between the first resistor R1 and the first temperature sensor NTCT1 is inputted into a negative terminal (−) of the first comparator OP1 and the first reference voltage Vref1 is inputted into a positive terminal (+) of the first comparator OP1. When a resistance of the first temperature sensor NTCT1 increases according to decrease of the ambient temperature, the first sense voltage VSE1 of the connection node between the first resistor R1 and the first temperature sensor NTCT1 increases. For example, when the ambient temperature becomes lower than the reference temperature Tref, the first sense voltage VSE1 may become greater than the first reference voltage Vref1. As a result, the first comparator OP1 outputs the compensation control voltage VCPC of a high level and the compensation control voltage VCPC of a high level is inputted into a gate of the first transistor T1 through the first inverter INV1.

The first transistor T1 outputs a compensation voltage VCP corresponding to the ambient temperature by switching according to the compensation control voltage VCPC of the first comparator OP1.

The first transistor T1 is connected to a second temperature sensing part for generating the second sense voltage VSE2 and the charge pumping part 180. For example, the second temperature sensing part may include a second resistor R2 and a second temperature sensor NTCT2 connected in series between the source voltage VDD and the ground voltage. In addition, the second temperature sensor NTCT2 may include a thermally sensitive resistor (thermistor) having a negative temperature coefficient (NTC) such that a resistance increases according to decrease of an ambient temperature and the first transistor T1 may have a positive type.

The second sense voltage VSE2 of a connection node between the second resistor R2 and the second temperature sensor NTCT2 is inputted into a source of the first transistor T1. When a resistance of the second temperature sensor NTCT2 increases according to decrease of the ambient temperature, the second sense voltage VSE2 of the connection node between the second resistor R2 and the second temperature sensor NTCT2 increases. For example, when the ambient temperature becomes lower than the reference temperature Tref, the compensation control voltage VCPC of a high level may be inputted into the gate of the first transistor T1 through the first inverter INV1 and the first transistor T1 may be turned on. As a result, the second sense voltage VSE2 inputted into the source of the first transistor T1 is outputted from a drain of the first transistor T1 as the compensation voltage VCP and the compensation voltage VCP is stored in a third capacitor C3.

When the ambient temperature is equal to or higher than the reference temperature Tref, the first comparator OP1 outputs the compensation control voltage VCPC of a low level and the first transistor T1 is turned off by the compensation control voltage VCPC of a low level. Accordingly, the second sense voltage VSE2 as the compensation voltage VCP is not stored in the third capacitor C3. In addition, when the ambient temperature is lower than the reference temperature Tref, the first comparator OP1 outputs the compensation control voltage VCPC of a high level and the first transistor T1 is turned on by the compensation control voltage VCPC of a high level. Accordingly, the second sense voltage VSE2 as the compensation voltage VCP is stored in the third capacitor C3.

The compensation voltage VCP corresponding to the second sense voltage VSE2 may have a voltage within a range of the ground voltage to the source voltage VDD. For example, the compensation voltage VCP may linearly increase according to decrease of the ambient temperature when the ambient temperature is in the linear section lower than the reference temperature Tref and may have a constant voltage substantially the same as the source voltage VDD when the ambient temperature is beyond the linear section lower than the reference temperature Tref.

The second comparator OP2 compares a third sense voltage VSE3 corresponding to the compensated gate high voltage VGH from the charge pumping part 180 with a second reference voltage Vref2 to output the feedback voltage VFB. The second transistor T2 controls and stabilizes the compensation voltage VCP from the first transistor T1 according to the feedback voltage VFB.

The second comparator OP2 is connected to the charge pumping part 180 for generating the third sense voltage VSE3 and the second transistor T2, and the second transistor T2 is connected to the first transistor T1 for generating the compensation voltage VCP. For example, the second comparator OP2 may include an operational amplifier (OP AMP) and the second transistor T2 may have a negative type.

The third sense voltage VSE3 of a connection node between third and fourth resistors R3 and R4 is inputted into a negative terminal (−) of the second comparator OP2 and the second reference voltage Vref2 is inputted into a positive terminal (+) of the second comparator OP2. In addition, the feedback voltage VFB outputted from the second comparator OP2 is inputted into a gate of the second transistor T2 through the second inverter INV2, and a drain of the second transistor T2 is connected to the source of the first transistor T1 and the third capacitor C3.

The third sense voltage VSE3 of the connection node between the third and fourth resistors R3 and R4 may vary proportional to the compensated gate high voltage VGH from the charge pumping part 180. When the compensated gate high voltage VGH of the charge pumping part 180 in a low temperature surroundings deviates from a predetermined target value, the third sense voltage VSE3 also deviates from the predetermined second reference voltage Vref2 and the second comparator OP2 outputs the feedback voltage VFB corresponding to a difference between the third sense voltage VSE3 and the second reference voltage Vref2.

The feedback voltage VFB is inputted into the gate of the second transistor T2 through the second inverter INV2 to turn on the second transistor T2. Since the feedback voltage VFB corresponds to the difference between the third sense voltage VSE3 and the second reference voltage Vref2, the gate high voltage VGH by the compensation voltage VCP from the first transistor T1 is adjusted by an ON-current of the second transistor T2 to approach the target value.

The charge pumping part 180 includes first to fourth diodes D1 to D4, first to fourth capacitors C1 to C4, and third and fourth resistors R3 and R4. The first to fourth diodes D1 to D4 and the third and fourth resistors R3 and R4 are connected in series between the source voltage VDD and the ground voltage. The first capacitor C1 is connected to a connection node between the first and second diodes D1 and D2, and the second capacitor C2 is connected to a connection node between the second and third diodes D2 and D3. In addition, the third capacitor C3 is connected to a connection node between the third and fourth diodes D3 and D4, and the fourth capacitor C4 is connected to the fourth diode D4.

Each of the first and second capacitors C1 and C2 is charged up to the source voltage VDD and the source voltage VDD stored in each of the first and second capacitors C1 and C2 is transmitted to the fourth capacitor C4 by switches (not shown). Accordingly, the fourth capacitor C4 is charged up to a voltage (2VDD) that is twice as high as the source voltage VDD.

The third capacitor C3 is charged up to a voltage corresponding to the ambient temperature. For example, since the first transistor T1 is turned off when the ambient temperature is equal to or higher than the reference temperature Tref, the third capacitor C3 may not be charged up. In addition, since the first transistor T1 is turned on when the ambient temperature is lower than the reference temperature Tref, the third capacitor C3 may be charged up to the second sense voltage VSE2 corresponding to the ambient temperature as the compensation voltage VCP. The compensation voltage VCP stored in the third capacitor C3 is transmitted to and stored in the fourth capacitor T4 by switches (not shown).

As a result, the fourth capacitor C4 is charged up to a voltage that is a sum of voltages stored in the first to third capacitors C1 to C3. For example, when the ambient temperature is equal to or higher than the reference Tref, the fourth capacitor C4 may be charged up to a voltage (2VDD) that is twice as high as the source voltage VDD. In addition, when the ambient temperature is lower than the reference temperature Tref, the fourth capacitor C4 may be charged up to a voltage (2VDD+VCP) that is a sum of the twice of the source voltage VDD and the compensation voltage VCP. The voltage stored in the fourth capacitor C4 is outputted as the gate high voltage VGH to the level shifting part 172 (of FIG. 4) of the power IC 160.

The third sense voltage VSE3 of a connection node between the third and fourth resistors R3 and R4 is determined by the gate high voltage VGH of a connection node between the fourth diode D4 and the third resistor R3 according to a voltage distribution. As a result, the third sense voltage VSE3 varies proportional to the gate high voltage VGH.

The third sense voltage VSE3 and the second reference voltage Vref2 are compared by the second comparator OP2 and the compensation voltage VCP is adjusted according to the feedback voltage VFB as a comparison result. Accordingly, the gate high voltage VGH is stabilized in a relatively short time period.

Figure 6:
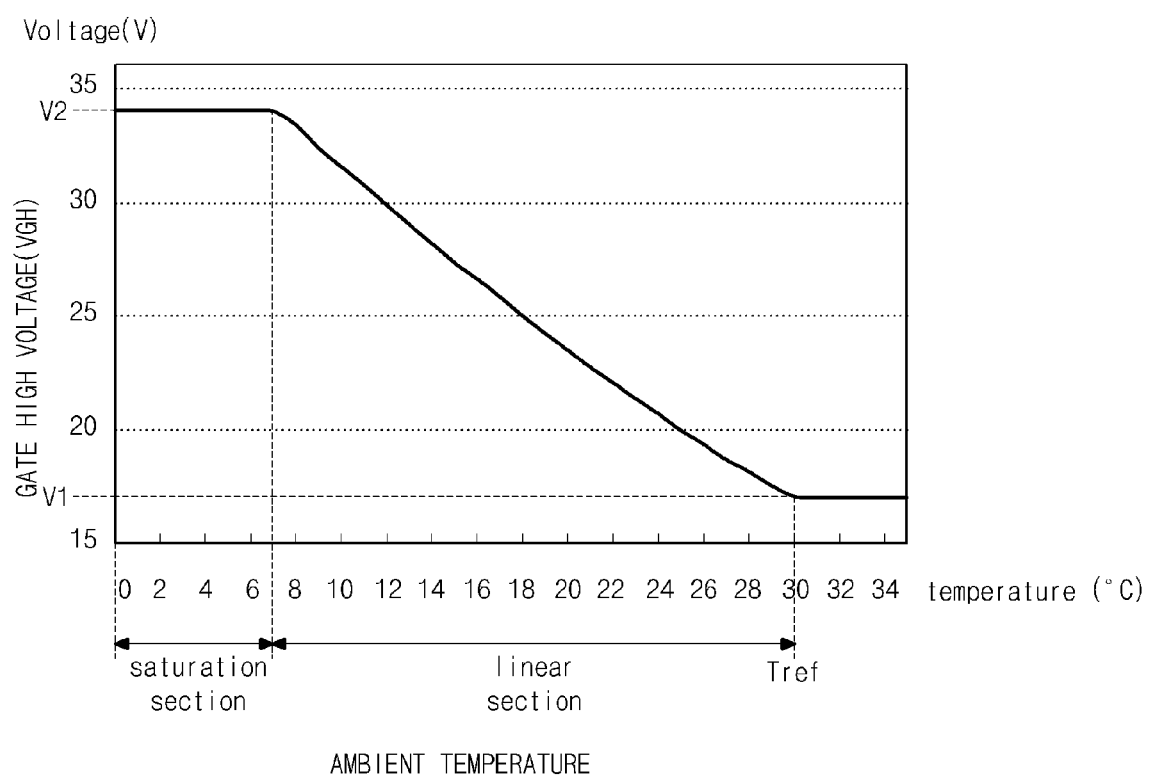
FIG. 6 is a view showing a gate high voltage outputted from a power supplying unit for a liquid crystal display device according to an embodiment of the present invention.

FIG. 6 is a view showing a gate high voltage outputted from a power supplying unit for a liquid crystal display device according to an embodiment of the present invention.

In FIG. 6, when an ambient temperature is equal to or higher than a reference temperature Tref, the gate high voltage VGH outputted from the power supplying unit 150 (of FIG. 4) have a constant first voltage V1. When the ambient temperature is lower than the reference temperature Tref, the power supplying unit 150 outputs the compensated gate high voltage VGH. For example, in a linear section where the ambient temperature is lower than the reference temperature Tref, the gate high voltage VGH may have a voltage that linearly increases from the first voltage V1 to a second voltage V2 higher than the first voltage according to decrease of the ambient temperature. In addition, in a saturation section beyond the linear section, the gate high voltage VGH may have the constant second voltage V2. The reference temperature may be about 30° C., and the first and second voltages V1 and V2 may be about 17V and about 34V, respectively. In another embodiment, the linear section and the saturation section as well as the reference temperature Tref, the first voltage V1 and the second voltage V2 may be modified according to an environment where the LCD device is used.

Consequently, in a power supplying unit and an LCD device including the power supplying unit according to the present disclosure, since a gate high voltage that linearly increases according to decrease of an ambient temperature is supplied by using a linear low temperature compensating circuit, power consumption is reduced. In addition, since the linear low temperature compensating circuit is integrated in a power IC, fabrication cost is reduced. Further, since the gate high voltage from the linear low temperature compensating circuit is rapidly stabilized by using a feedback circuit, display quality is improved.

It will be apparent to those skilled in the art that various modifications and variations can be made in a power supplying unit and a liquid crystal display device including the power supplying unit of the present disclosure without departing from the sprit or scope of the invention. Thus, it is intended that the present invention covers the modifications and variations of this invention provided they come within the scope of the appended claims and their equivalents.

What is claimed is:

1. A power supplying unit for a liquid crystal display device, comprising:
    a power integrated circuit configured to generate a source voltage and a compensation voltage, the compensation voltage linearly varying according to an ambient temperature; and
    a charge pumping part configured to generate a gate high voltage using the source voltage and the compensation voltage, the gate high voltage linearly varying when the ambient temperature is lower than a reference temperature,
    wherein the power integrated circuit comprises:
    a boosting part configured to generate the source voltage;
    a linear low temperature compensating part configured to generate the compensation voltage; and
    a level shifting part configured to output the gate high voltage by switching,
    wherein the linear low temperature compensating part comprises:
    a compensation controlling part configured to generate a compensation control voltage corresponding to the ambient temperature; and
    a low temperature compensating part configured to generate the compensation voltage according to the compensation control voltage, and
    wherein the low temperature compensating part comprises:
    a second temperature sensing part configured to output a second sense voltage; and
    a first transistor configured to output the second sense voltage as the compensation voltage by switching according to the compensation control voltage.

2. The power supplying unit according to claim 1, wherein the compensation controlling part comprises:
    a first temperature sensing part including a first resistor and a first temperature sensor connected in series between a digital source voltage and a ground voltage, the first temperature sensing part outputting a first sense voltage from a first connection node between the first resistor and the first temperature sensor; and
    a first comparator for outputting the compensation control voltage by comparing the first sense voltage with a first reference voltage.

3. The power supplying unit according to claim 2, wherein the second temperature sensing part includes a second resistor and a second temperature sensor connected in series between the source voltage and the ground voltage, and the second sense voltage is outputted from a second connection node between the second resistor and the second temperature sensor.

4. The power supplying unit according to claim 3, wherein at least one of the first and second temperature sensors includes a thermistor having a negative temperature coefficient, and the first transistor has a positive type.

5. The power supplying unit according to claim 1, wherein the power integrated circuit further comprises a feedback part for controlling the gate high voltage using a feedback voltage corresponding to the gate high voltage.

6. The power supplying unit to claim 5, wherein the feedback part comprises:
    a second comparator for outputting the feedback voltage by comparing a third sense voltage corresponding to the gate high voltage with a second reference voltage; and
    a second transistor for adjusting the compensation voltage by switching according to the feedback voltage.

7. The power supplying unit according to claim 1, wherein the charge pumping part comprises:
    first to fourth diodes connected in series between the source voltage and a ground voltage; and
    first to fourth capacitors, the first capacitor connected between the first and second diodes, the second capacitor connected to the second and third diodes, the third capacitor connected between the third and fourth diodes, and the fourth capacitor connected to the fourth diode.

8. The power supplying unit according to claim 7, wherein at least one of the first and second capacitors is charged up to the source voltage, wherein the third capacitor is charged up to the compensation voltage, and wherein the fourth capacitor is charged up to a sum of twice of the source voltage and the compensation voltage.

9. The power supplying unit according to claim 1, wherein the compensation voltage varies reverse proportion to the ambient temperature
    and the gate high voltage varies in reverse proportion to the ambient temperature when the ambient temperature is lower than the reference temperature.

10. The power supplying unit according to claim 1,
wherein the charge pumping part generates one of the gate high voltage of a first voltage when the ambient temperature is equal to or higher than the reference temperature, the gate high voltage having the linearly varying voltage according to a decrease of the ambient temperature when the ambient temperature is in a linear section lower than the reference temperature, and the gate high voltage of a second voltage greater than the first voltage when the ambient temperature is beyond the linear section lower than the reference temperature.

11. A liquid crystal display device, comprising:
a liquid crystal panel displaying an image;
a data driving unit supplying a data signal to the liquid crystal panel;
a timing controlling unit supplying an RGB data and a data control signal to the data driving unit; and
a power supplying unit supplying a gate high voltage to the liquid crystal panel,
wherein the power supplying unit comprises:
a power integrated circuit configured to generate a source voltage and a compensation voltage, the compensation voltage linearly varying according to an ambient temperature; and
a charge pumping part configured to generate the gate high voltage using the source voltage and the compensation voltage, the gate high voltage linearly varying when the ambient temperature is lower than a reference temperature,
wherein the power integrated circuit comprises:
a boosting part configured to generate the source voltage;
a linear low temperature compensating part configured to generate the compensation voltage; and
a level shifting part configured to output the gate high voltage by switching,
wherein the linear low temperature compensating part comprises:
a compensation controlling part configured to generate a compensation control voltage corresponding to the ambient temperature; and
a low temperature compensating part configured to generate the compensation voltage according to the compensation control voltage, and
wherein the low temperature compensating part comprises:
a second temperature sensing part configured to output a second sense voltage; and
a first transistor configured to output the second sense voltage as the compensation voltage by switching according to the compensation control voltage.

12. The liquid crystal display device according to claim 11, wherein the liquid crystal panel comprises:
a displaying unit displaying the image; and
a gate driving unit generating a gate signal using the gate high voltage.

13. The liquid crystal display device according to claim 12, wherein the displaying unit includes a pixel thin film transistor and the gate high voltage corresponds to a voltage for turning on the pixel thin film transistor.

* * * * *